Oct. 23, 1951 E. R. TAYLOR 2,572,216

SIGNAL RECEIVING SYSTEM

Filed April 1, 1944 2 SHEETS—SHEET 1

INVENTOR
E.R. TAYLOR
BY
N. S. Ewing
ATTORNEY

Oct. 23, 1951 E. R. TAYLOR 2,572,216

SIGNAL RECEIVING SYSTEM

Filed April 1, 1944 2 SHEETS—SHEET 2

INVENTOR
E.R. TAYLOR
BY
N. S. Ewing
ATTORNEY

Patented Oct. 23, 1951

2,572,216

UNITED STATES PATENT OFFICE 2,572,216

SIGNAL RECEIVING SYSTEM

Edmund R. Taylor, Pelham Manor, N. Y., assignor to Bell Telephone Laboratories, Incorporated, New York, N. Y., a corporation of New York Application April 1, 1944, Serial No. 529,092

7 Claims. (Cl. 250—20)

This invention relates to scanning systems and more particularly to systems in which a selective means cyclically scans a wave frequency range or other subject and selects in succession wave effects of different frequencies that appear in the frequency range, or other effects according to the nature of the subject, and in which the successively selected effects are individually oscilloscopically displayed or otherwise utilized.

A broad object of this invention is to provide an improved frequency scanning system of increased accuracy, sensitivity and flexibility capable of dependable operation over a wide frequency range.

A further object is to reduce the range of frequency variation required of the beating oscillator in the heterodyne type of frequency range scanner.

A further object is to eliminate the practical difficulty of obtaining wide monitoring frequency ranges without resort to high operating frequencies.

A more specific object is to offset or neutralize the undesirable effects that changes in temperature and other operating conditions have on the operation of a scanning system.

In accordance with the present invention, as embodied in a frequency scanning system, a plurality of frequency scanners are employed in tandem relation, the first scanner being cyclically operative over the frequency range of interest and each other scanner being connected to scan the wave output of the preceding scanner. In accordance with a feature of the invention the first of the tandem scanners is assigned a relatively broad frequency selective characteristic and succeeding scanners have progressively narrower frequency selective characteristics. Another feature provides for maintaining the band of waves delivered by each scanner at a fixed frequency position whereby the succeeding scanner is required to operate over only a limited fixed frequency range. In accordance with still other features the effect that changes in temperature and other operating conditions have on the operation of one frequency scanner is offset or neutralized by the effects such changes have on another of the scanners. As the expression is used herein, "scanning" denotes a process in which the elements constituting the total subject are, repeatedly and continually, selected successively in a systematic manner. "Frequency scanning" denotes scanning in which the elements are selected according to frequency, or in other words it signifies continually repeated successive selection of the different components of a wave frequency range.

The nature of the present invention and its various features, objects and advantages will appear more fully from a consideration of the following description of the embodiments illustrated in the accompanying drawings. In the drawings.

Figures 1, 2:
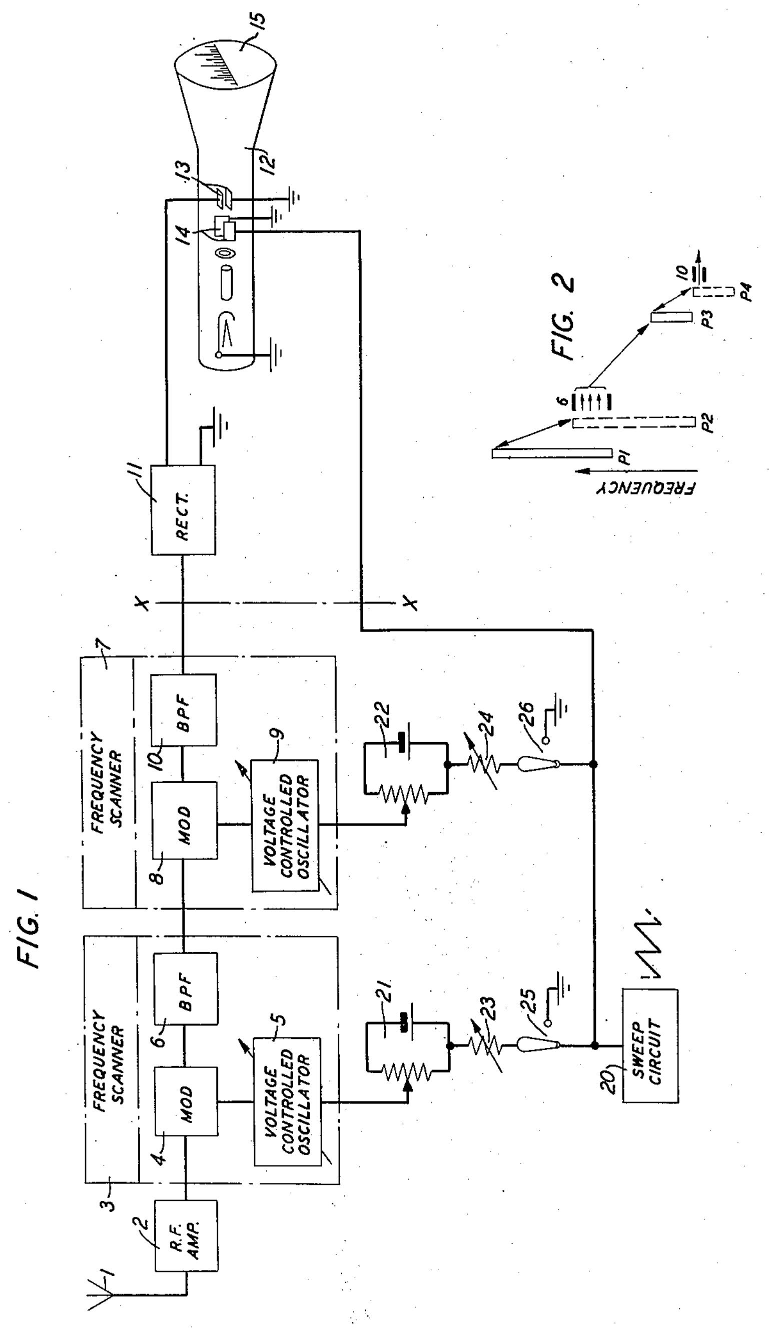
Fig. 1 illustrates a so-called panoramic radio receiving system for monitoring a predetermined range of radio frequencies and indicating oscilloscopically the frequencies of the signals appearing in that range.
Fig. 2 illustrates diagrammatically certain features of the design and operation of the Fig. 1 system.

Referring more particularly now to Fig. 1, the system illustrated therein comprises a radio receiving antenna 1 and a radio frequency amplifier 2 through which all received waves lying within the frequency range of interest are applied to the input of a frequency scanner 3. The frequency range of interest may be for specific example the radio broadcast band. Scanner 3 comprises a modulator 4 to which the received band is applied and a variable frequency oscillator 5 for supplying beating oscillations concurrently to the modulator 4. In the output of modulator 4 the applied frequency band appears as a sideband, translated in frequency more or less, according to the operating frequency of oscillator 5. The sideband, and it will be assumed that it is an upper sideband, is applied to a band-pass filter 6 which has a relatively broad frequency selective characteristic. The width of band passed by filter 6 may be for specific example one-quarter of the width of the applied sideband.

The operating frequency of oscillator 5 is varied cyclically between predetermined limits such that at the output of modulator 4 the sideband progresses during each cycle from an initial or upper frequency position P1 to a lower frequency position P2 and returns instantly to its initial position P1 for the beginning of the next cycle. The limits are so chosen with reference to the pass frequency of filter 6 that with the sideband in the position P1 the lower quarter of the sideband is passed by the filter and with the sideband in position P2, the upper quarter is passed by the filter. These relations are indicated diagrammatically in Fig. 2. In purpose and effect the filter 6 and the frequency scanner 3 of which it is a part repeatedly traverse the frequency range of interest and at each point in the traverse select all of the signals lying within a fractional part of the frequency range. The wave output of scanner 3 and filter 6 is of continually changing composition but is confined to the pass frequency range of filter 6.

The output of the scanner 3 is connected to the input of a second frequency scanner 7. The latter comprises a modulator 8, an associated beating oscillator 9 and a band-pass filter 10 connected to the output of the modulator. The operating frequency of oscillator 9 is varied in the same manner as that of oscillator 5 and between frequency limits such that one of the sidebands derived from the band of waves received from the scanner 3 is swept repeatedly across the pass frequency of filter 10. The extreme positions P3 and P4 of the sideband, assuming again an upper sideband, are represented in Fig. 2 in relation to the pass-band of filter 10. The latter is made narrow enough to discriminate between and selectively transmit the several radio signals that may be encountered in the applied sideband.

The cyclical operation of the two frequency scanners 3 and 7 may be so synchronized in a manner to be described that while scanner 3 progresses from the low frequency end to the high frequency end of the radio frequency range, scanner 7 simultaneously progresses from the low end to the high end of the pass-band of filter 6. In such case scanner 7 in effect cyclically traverses the radio frequency range to be monitored and transmits in succession the signals of different frequencies that are successively encountered therein. At the output terminals of filter 10 each signal appears momentarily, once during each scanning cycle, and at the same relative point in each cycle.

The output circuit of frequency scanner 7 is connected through a rectifier 11 to the deflecting plates 13 of a cathode ray tube 12. Rectifier 11 serves to convert each momentarily applied signal wave into a unidirectional voltage that is more or less proportional to the intensity of the signal. Deflecting plates 13 are so oriented that the cathode-ray and also the luminous spot produced by the ray on luminescent screen 15 are deflected vertically upward whenever a signal-produced unidirectional voltage is received from rectifier 11. The position of the luminous spot along a horizontal reference axis, or frequency scale, on the screen 15 is simultaneously controlled by deflecting plates 14 and a control voltage applied thereto from sweep circuit 20. The latter produces a periodic voltage wave of such shape and phase that the spot moves along the horizontal frequency scale in synchronism with the relative progression of scanner 7 across the radio frequency range. Each point along the frequency scale can therefore be identified with a particular radio frequency. During each scanning cycle, then, the luminous spot moves along the frequency scale and whenever a signal is encountered by the scanning system it is deflected vertically upward leaving a vertical luminous line the position of which identifies the frequency of the signal and the length of which is more or less proportional to the intensity of the signal. If the repetitive rate of scanning be made of the order of fifteen times a second or greater, the luminous marks will appear to remain continuously on the screen, fluctuating in length as the respective signals fluctuate in intensity. A lower scanning rate may be employed if desired, however, particularly, if a high persistence screen 15 be employed.

The beating oscillators 5 and 9 may be of any type suitable for the functions described. They may comprise electro-mechanical means for cyclically varying the operating frequency or they may be of another well-known type, commonly employing a voltage-responsive reactance tube, in which the operating frequency is variable under the control of an applied voltage. The control voltage applied to oscillator 5 may be a saw-toothed voltage wave derived from sweep circuit 20 as indicated in Fig. 1. The amplitude of the applied saw-toothed wave determines the extent of the frequency variation of the beating oscillations, and it may be adjusted by means of a variable attenuator 23 or the like. Biasing source 21 of adjustable voltage is interposed to permit adjustment of the mean frequency of the beating oscillations. Attenuator 23 thus controls the extent of the frequency range that is traversed by scanner 3 and the adjustable biasing means 21 determines the absolute frequency position of the portion of the range that is scanned. Switch 25 permits disconnection of oscillator 5 from sweep circuit 20 so that if desired scanner 3 may be stopped and adjusted to some particular part of the applied frequency range.

The operating frequency of oscillator 9 is similarly varied in accordance with the amplitude of the control voltage applied to it. Adjustable source 22 allows control of the voltage bias and attenuator 24 controls the extent of variation of the variable applied voltage. In the simplest case the varying voltage is derived from sweep circuit 20 as indicated in Fig. 1, in which case frequency scanner 7 repeatedly traverses at a linear rate the pass frequency range of filter 6 in synchronism with the traverse of scanner 3 across the monitored frequency range. It will be appreciated, however, that the frequency and shape of the periodic wave applied through attenuator 24 determines in general whether the repetitive rate of scanner 7 is the same as or, for example, many times as high as that of scanner 3, and whether scanner 7 operates at a linear rate or in accordance with some other law of variation. Inasmuch as the relative movement of filter 10 across the monitored frequency range is dependent on the combined effect of the voltages used to control oscillators 5 and 9, it will be appreciated that in the general case both control voltages should jointly influence deflecting plates 14 if a systematic frequency scale is to be obtained on screen 15. In the simplest case, however, the two control waves are alike in periodicity and shape and it suffices to connect deflecting plates 14 to the common source, viz., sweep circuit 20.

It may be desired at times to display a small portion of the radio frequency range in considerable detail on the cathode-ray screen 15. Increased detail may be had by adjusting attenuator 24 to reduce the frequency variation of oscillator 9, and the frequency range within which the increased detail is had may be selected by adjustment of biasing source 22, scanner 3 being stopped at an appropriate point in the applied frequency range. If desired, too, scanner 7 may be stopped by means of switch 26 and adjusted manually to select some particular signal. It will be apparent that the several manual controls allow considerable flexibility in the operation of the scanning system.

Figure 3:
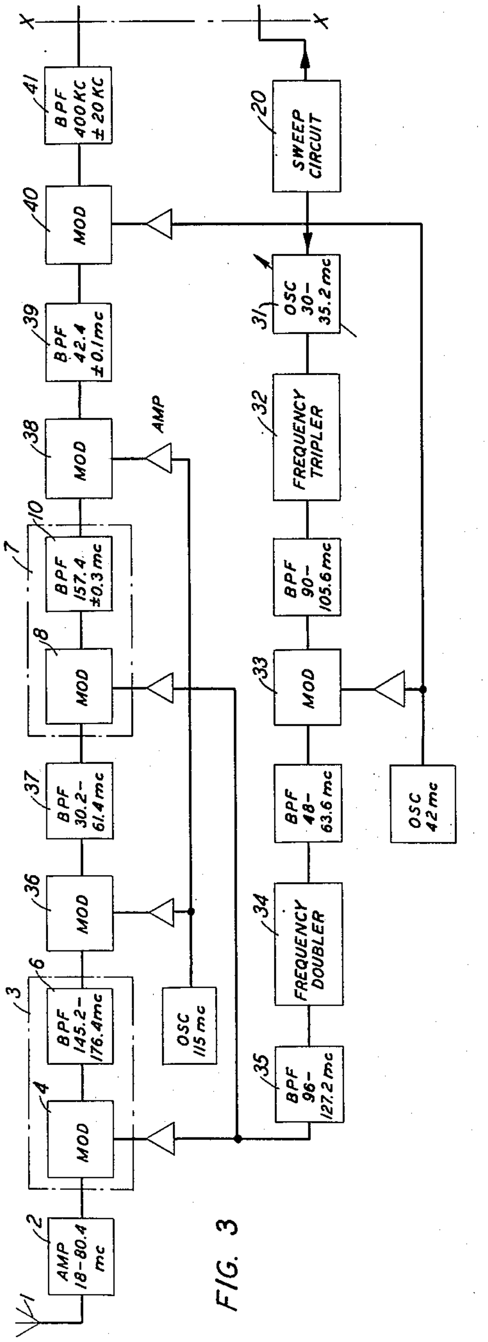
Figs. 3 and 4 illustrate other embodiments of the invention.

Fig. 3 illustrates an embodiment of the invention that utilizes the same basic principles as the Fig. 1 system but that is more especially designed for operation over an ultra-high frequency radio range. Corresponding elements of the several figures, it may be noted, are assigned the same reference numbers. In the interest of a complete disclosure of a specific embodiment of the invention and to facilitate understanding of the construction and operation, specific frequencies and frequency ranges are indicated throughout the Fig. 3 circuit diagram. Thus it will be assumed that the frequency range to be monitored extends from 18 to 80.4 megacycles. All waves within the assumed frequency range are applied through amplifier 2 to the modulator 4 of frequency scanner 3. Beating oscillations for modulator 4 are derived from oscillator 31 which varies in operating frequency from 30 to 35.2 megacycles periodically under the control of sweep circuit 20. A frequency multiplier 32 triples the frequency of the output of oscillator 31, thus producing oscillations that vary periodically in frequency from 90 to 105.6 megacycles. These oscillations are applied through a band-pass filter to a modulator 33 where they are combined with beating oscillations having a constant frequency of 42 megacycles. The lower side frequency, which ranges from 48 to 63.6 megacycles is applied to a frequency multiplier 34 that doubles the oscillation frequency. The resulting oscillations, which vary periodically between 96 and 127.2 megacycles, are applied then through a filter 35 and buffer amplifier to modulator 4.

In its lower or P1 position the upper sideband produced by modulator 4 extends from 114 to 176.4 megacycles, and in its upper or P2 position it extends from 145.2 to 207.6 megacycles. This sideband is applied to scanning filter 6, the pass-band of which extends from 145.2 to 176.4 megacycles. The relative frequencies are as illustrated in Fig. 2 except that in this case the pass-band of the filter is half as wide as the applied sideband.

The frequency selection effected by filter 6 is supplemented at another frequency level by filter 37 which is connected to the output of filter 6 through a frequency translator. The latter comprises a modulator 36 which is supplied with beating oscillations having a fixed frequency of 115 megacycles and which produces a lower sideband that ranges from 30.2 to 61.4 megacycles, these being the limiting frequencies passed by filter 37.

The wave output of filter 37 is applied to a second frequency scanner 7 comprising modulator 8 and band-pass filter 10. Modulator 8 receives beating oscillations from filter 35 through a buffer amplifier, thereby producing a 31.2 megacycle sideband which in its upper and lower extreme positions extends from 126.2 to 157.4 megacycles and from 157.4 to 188.6 megacycles, respectively. The pass-band of filter 10 extends from about 157.1 to 157.7 megacycles. The frequency selection effected by filter 10 is supplemented at successively lower frequency levels by filters 39 and 41 which have progressively sharper frequency selective characteristics. More particularly, the wave output of filter 10 is applied to a modulator 38 which is supplied with beating oscillations having a frequency of 115 megacycles, and the resulting lower sideband is applied to filter 39 which has a pass-band 0.2 megacycle in width ranging downwards from 42.5 megacycles. Modulator 40 receives the 200-kilocycle band from filter 39 and beating oscillations of 42 megacycles. Filter 41 may have a mean pass frequency of 400 kilocycles and a pass-band width of 40 kilocycles. Treating filters 10, 39 and 41 with the intervening modulators as a unitary selective means it may be said that the second frequency scanner selects a band 40 kilocycles wide. The selected band and also the saw-toothed voltage wave from sweep circuit 20 may be applied to the oscilloscope as in the Fig. 1 system. The manually operated elements 21 to 26 of the latter system may also be employed for the purposes described.

The tandem-scanning systems herein disclosed have several advantages over comparable single-stage scanning systems of the prior art, and these advantages will be found of considerable importance from a practical standpoint in many instances. One advantage lies in the substantial reduction in the frequency change required of the beating oscillations supplied to the modulators. Referring to scanner 3 of the Fig. 1 system, the reduction amounts to 25 per cent, for the frequency change required of oscillator 5 is not coextensive with the width of the monitored frequency range but only three-quarters thereof; and in the Fig. 3 system the corresponding reduction is 50 per cent. In scanner 7, likewise, the frequency range covered by the beating oscillations is only a portion of the monitored frequency range. A further advantage lies in the substantial reduction in the ratio of the frequency variation of the beating oscillations to the uppermost beating frequency. That is, the practical difficulty of obtaining wide monitoring frequency ranges without resort to high operating frequencies is largely overcome. Still another advantage relates to the scanning, and the production of a magnified view of, only a part of the frequency spectrum for which the system is adapted. In the case of a single-stage scanner this presents the difficulty of providing the beating oscillator with a frequency controller, electrical or mechanical, that is not only operative over the maximum required frequency range but also accurate and sensitive when only a relatively small frequency variation is required. In accordance with the present invention, on the other hand, this difficulty is avoided, for the beating oscillators associated with the successive tandem scanners may be specifically designed for widely different frequency variations and at least one of them may be well adapted for the particular width of frequency range to be scanned and magnified. In such case the preceding scanner or scanners may be stopped, as explained hereinbefore.

The specific embodiment illustrated in Fig. 4 differs from that described with reference to Fig. 3 principally in respect of the means provided for producing the beating oscillations of variable frequency. There are differences also in the frequencies of the fixed oscillators and in the limiting frequencies of the several filters; these frequencies are all indicated in Fig. 4. In the Fig. 4 system there are provided two sweep circuits 20 and 45 that have substantially identical operating frequencies. They may be synchronized by connection to a common sine wave source 44 that has a frequency of 15 cycles per second, for specific example. Sweep circuit 20 controls the variable frequency oscillator 31 as described with reference to Fig. 3, and sweep circuit 45 controls a substantially identical oscillator 46. The two sweep circuits 20 and 45 are so biased and poled or otherwise so arranged that the voltage produced by the one decreases during the period that the voltage produced by the other increases. Hence the operating frequency of oscillator 31 progressively increases from 30 to 35.2 megacycles while that of oscillator 46 progressively decreases from 35.2 to 30 megacycles.

The wave output of oscillator 31 is tripled in frequency by frequency multiplier 32, filtered, and applied to modulator 33 together with beating oscillations having a frequency of 140 megacycles. One of the side frequencies varies from 230 to 245.6 megacycles and this is applied to modulator 49 together with oscillations of tripled frequency derived from oscillator 46 through frequency multiplier 47. The difference frequency, which ranges from 124.4 to 155.6 megacycles, is selected by filter 35 and applied to the modulators 4 and 8. Hence during each cycle of the sweep circuits 20 and 45 the beating oscillations delivered by filter 35 increase progressively from 124.4 to 155.6 megacycles. The variation in beating frequency, that is, 31.2 megacycles, is twice the frequency variation of the oscillations applied to modulator 49.

Figure 4:
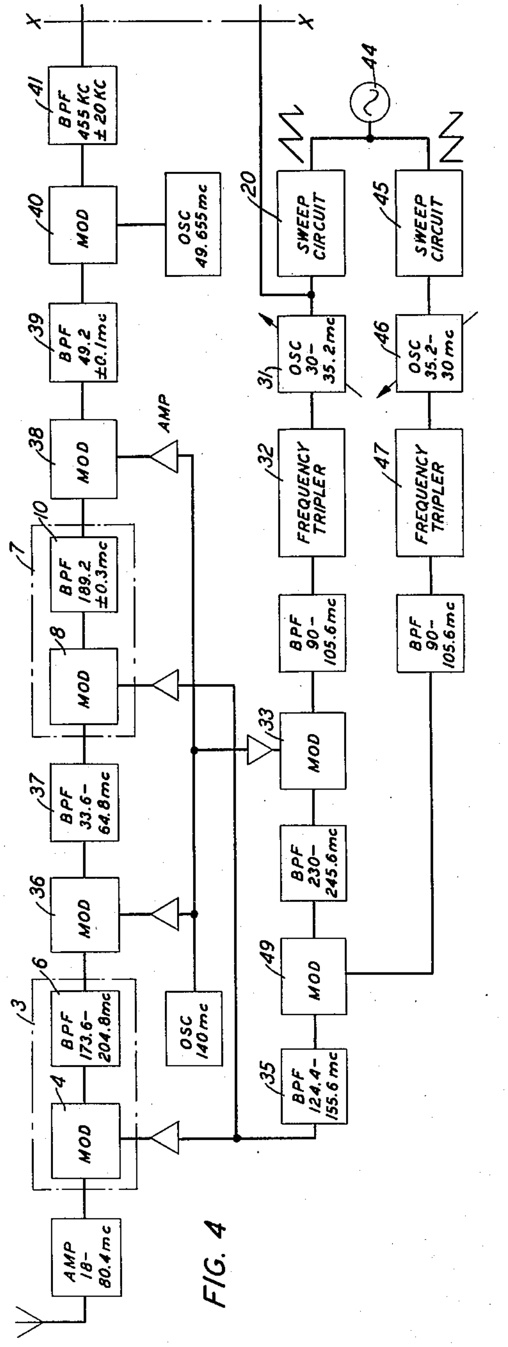

An important feature of the Fig. 4 system is that any variation in temperature or other operating condition that affects the two variable frequency oscillators 31 and 46 substantially equally, is largely neutralized in so far as its effect on the frequency of the oscillations delivered by filter 35 is concerned. For example, a given change in ambient temperature would tend to change the operating frequencies of the two substantially identical oscillators 31 and 46 to the same extent and in the same direction. The difference in operating frequency at any instant would remain unaffected, however, and the difference-frequency produced in modulator 49 and supplied through filter 35 to the modulators would likewise be unaffected by the change in temperature.

Although the invention has been described with reference to specific embodiments thereof, it will be understood that the invention may be embodied in various other forms within the spirit and scope of the appended claims.

What is claimed is:

1. In combination, a first scanner comprising wave translating means for cyclically scanning a predetermined frequency range within which electric waves of different frequencies may appear, said first scanner including frequency selective means limiting the wave output thereof to a wave frequency range that is narrower than said first-mentioned frequency range, a second scanner connected to receive the said wave output of said first scanner, said second scanner comprising means for cyclically scanning the said narrower frequency range, said second scanner including frequency selective means limiting the response thereof at any moment to waves within a still narrower frequency range, and means for synchronizing the respective cyclical operations of the first and second scanners.

2. A combination in accordance with claim 1 in which said last-mentioned frequency selective means is at least several times more sharply selective than the first-mentioned frequency selective means.

3. A wave frequency range scanning system comprising a modulator, said modulator having electric wave input means, a pair of substantially identical oscillation generators, means for varying the oscillation frequency of said generator cyclically, in mutually opposite senses, and to substantially the same extent, means for deriving from said oscillation generators a beating oscillation the frequency of which cyclically varies as a function of the difference between said oscillation frequencies, means for supplying said beating oscillations to said modulator, and frequency selective means connected to receive modulation products from said modulator.

4. In combination, a pair of oscillation generating means, means for varying the respective oscillation frequencies of said generating means cyclically and in mutually opposite senses between substantially the same predetermined frequency limits, means for deriving from the oscillations generated by said pair of means a beating oscillation, the frequency of which varies cyclically as a function of the difference between said oscillation frequencies, a modulator, means for applying waves to said modulator, means for concurrently applying said beating oscillation to said modulator, frequency selective wave transmission means having a transmission band that is substantially smaller than the frequency interval over which the frequency of said beating oscillation varies, said transmission means being connected to receive the wave output of said modulator, an oscilloscope having a luminescent screen and means for directing a luminescence-producing ray to said screen, means for deflecting said ray repeatedly across said screen in timed relation with the variation in frequency of said beating oscillation, and means for variably controlling said ray responsive to variations in the wave output of said frequency selective wave transmission means.

5. In combination, in a wave frequency range scanning system, an electric wave transmission path including in the relative order named, a first modulator, a first filter, a second modulator and a second filter, means for supplying to each of said modulators beating oscillations the frequency of which varies cyclically between predetermined limits, each of said filters having a transmission band not substantially wider than the range of frequency variation of the beating oscillations supplied to the modulator next preceding it, the transmission band of said first filter being at least several times as wide as the transmission band of said second filter, and means for synchronizing the respective cyclical variations of said beating oscillations supplied to said modulators.

6. In a wave frequency range scanning system comprising an electric wave transmission path including in the relative order named, an electric wave input device, a first modulator, a first filter, a second modulator and a second filter, means for supplying to each of said modulators beating oscillations the frequency of which varies cyclically between predetermined limits, means for synchronizing the respective cyclical variations of said beating oscillations supplied to said modulators, each of said filters having a transmission band not substantially wider than the range of frequency variation of the beating oscillations supplied to the modulator next preceding it, whereby input electric waves occupying a predetermined frequency band are scanned, the transmission band of said first filter being at least several times as wide as the transmission band of said second filter and being centered at a frequency that is greater than the width of said predetermined frequency band.

7. In combination, in a wave receiving system, a first modulator, means for impressing received waves on said modulator, means for concurrently impressing on said modulator beating oscillations the frequency of which varies cyclically over a first frequency interval, a first band-pass filter means connected to pass waves of the upper sideband only from the output of said modulator, a second modulator, wave translating means for impressing the wave output of said first filter means on said second modulator, means for concurrently impressing on said second modulator beating oscillations the frequency of which varies cyclically over a second frequency interval, means for synchronizing the respective cyclical variations of said beating oscillations supplied to said modulators, a second band-pass filter means connected to receive the wave output of said second modulator, utilization means connected to receive the wave output of said second filter means, said first frequency interval being at least substantially double the band-width of said first filter means, and both said second frequency interval and the said band-width of said first filter means being at least several times the band-width of said second filter means, said utilization means including a cathode ray oscilloscope, means for deflecting the cathode ray in predetermined correlation with the frequency variations of the beating oscillations impressed on said modulators, and ray controlling means continually responsive to the wave output of said second filter means.

EDMUND R. TAYLOR.

REFERENCES CITED

The following references are of record in the file of this patent:

UNITED STATES PATENTS

| Number | Name | Date |
|---|---|---|
| 1,753,444 | Ohl | Apr. 8, 1930 |
| 1,866,267 | Nicolson | July 5, 1932 |
| 1,882,772 | Callahan | Oct. 18, 1932 |
| 1,883,907 | Hathaway | Oct. 25, 1932 |
| 1,994,232 | Schuck, Jr. | Mar. 12, 1935 |
| 2,121,359 | Luck et al. | June 21, 1938 |
| 2,178,074 | Jakel et al. | Oct. 31, 1939 |
| 2,240,452 | Wolfskill | Apr. 29, 1941 |
| 2,279,151 | Wallace | Apr. 7, 1942 |
| 2,279,246 | Podliasky et al. | Apr. 7, 1942 |
| 2,282,092 | Roberts | May 5, 1942 |
| 2,287,925 | White | June 30, 1942 |
| 2,302,311 | Goldsmith | Nov. 17, 1942 |
| 2,307,029 | Elm | Jan. 5, 1943 |
| 2,333,322 | Levy | Nov. 2, 1943 |
| 2,343,115 | Noble | Feb. 29, 1944 |
| 2,361,956 | Moseley | Nov. 7, 1944 |
| 2,381,940 | Wallace et al. | Aug. 14, 1945 |
| 2,387,685 | Sanders | Oct. 23, 1945 |
| 2,416,346 | Potter | Feb. 25, 1947 |
| 2,445,562 | Cawein et al. | July 20, 1948 |
| 2,502,294 | Wallace | Mar. 28, 1950 |

FOREIGN PATENTS

| Number | Country | Date |
|---|---|---|
| 687,771 | France | Jan. 7, 1930 |